US006098876A

United States Patent [19]
Cheng

[11] Patent Number: 6,098,876
[45] Date of Patent: Aug. 8, 2000

[54] COIN RETURN CHUTE STRUCTURE OF PAYPHONE

[75] Inventor: Max Cheng, Taipei, Taiwan

[73] Assignee: Karlin Telecomm Corporation, Taiwan

[21] Appl. No.: 09/185,277

[22] Filed: Nov. 3, 1998

[51] Int. Cl.[7] .............................. B65G 11/00; G07D 1/00

[52] U.S. Cl. .......................... 232/57.5; 194/202; 379/145

[58] Field of Search .................................... 194/202, 344, 194/347, 348, 349; 379/145; 232/57.5

[56] References Cited

U.S. PATENT DOCUMENTS

| | | | |
|---|---|---|---|
| 5,146,492 | 9/1992 | Stone et al. | 194/202 X |
| 5,361,979 | 11/1994 | Anello et al. | 194/202 X |
| 5,818,917 | 1/1997 | Anello et al. | 194/202 X |

*Primary Examiner*—F. J. Bartuska
*Attorney, Agent, or Firm*—Ostrolenk, Faber, Gerb & Soffen, LLP

[57] ABSTRACT

A coin return chute structure adapted to be incorporated in a payphone includes two spaced wall plate and an outer chute member fixed between the two wall plates and defining therein a coin holding space. The coin return chute structure has a front side on which a front opening is formed for access to the coin holding space. The wall plates are each provided with three pivot holes to selectively receive therein a pivot pin for rotatably supporting lids of different sizes on the wall plates for closing the front opening. Cover plates of different sizes selected in accordance with the lid size used may be selectively fixed to the front opening for covering the portion of the opening that is not closed by the lid. An inner chute member is selectively mounted between the two wall plates to bypass the coin holding space by directing the returned coin directly out of the chute structure. Thus, the actual size of the front opening of the chute structure may determined by selecting the lid size and a non-holding type of coin returning operation may be achieved by adding the inner chute member.

2 Claims, 6 Drawing Sheets

COIN RETURN CHUTE STRUCTURE OF PAYPHONE

FIELD OF THE INVENTION

The present invention relates generally to a coin return structure of a payphone and in particular to a coin return chute which may be readily modified or converted to suit different requirements for coin returning.

BACKGROUND OF THE INVENTION

In using a payphone, a user has to deposit coins into the payphone and once the call ends, the remaining coins will be returned through a coin return basket or chute. The user may then pick up the returned coins.

There are in general two different types of coin returning manners. The first one involves forming a cavity or a basket inside the payphone which is accessible by the user and the coins to be returned are dropped into the basket and temporarily held therein (which will be referred to as holding type hereinafter). An example is shown in FIG. 6 of the attached drawings. A disadvantage of this way is that there has to be a large opening A provided on the payphone casing, which is closable by a lid B, in order to provide the payphone user with an access to the coin basket. However, such a structure provides burglars with a chance to damage the payphone casing by disposing an explosive material into the payphone casing via the opening so as to steal coins that were deposited into the payphone by the previous users.

The second way, which will be referred to as non-holding type herein, is to provide a chute inside the payphone which directly leads to outside the payphone and the returned coins will be transferred directly out of the payphone casing, no temporarily holding inside the payphone being needed. Thus there is no temporary holding space formed inside the payphone casing and no large opening for the user's access to the coins is needed.

The conventional designs, however, are not compatible with or convertible between each other so that the manufacturer of the payphone has to decide which of these two designs is to be adapted. Once adapted, it is in general impossible to change to the other one. This may cause certain problem and inconvenience in manufacturing the payphones.

Thus, it is desirable to provide a coin return chute structure which is convertible between the holding type and the non-holding type so as to facilitate the design/manufacture of the payphone.

SUMMARY OF THE INVENTION

Therefor, the primary object of the present invention is to provide a coin return chute structure of a payphone which is selectively convertible between the holding type and the non-holding type so as to enhance the convenience of design and manufacture of the payphone.

Another object of the present invention is to provide a coin return chute structure of a payphone wherein the lid size of the holding type is substantially reduced for safety purpose.

In accordance with the present invention, there is provided a coin return chute structure adapted to be incorporated in a payphone, comprising two spaced wall plate and an outer chute member fixed between the two wall plates and defining therein a coin holding space. The coin return chute structure has a front side on which a front opening is formed for access to the coin holding space. The wall plates are each provided with three pivot holes to selectively receive therein a pivot pin for rotatably supporting lids of different sizes on the wall plates for closing the front opening. Cover plates of different sizes selected in accordance with the lid size used may be selectively fixed to the front opening for covering the portion of the opening that is not closed by the lid. An inner chute member is selectively mounted between the two wall plates to bypass the coin holding space by directing the returned coin directly out of the chute structure. Thus, the actual size of the front opening of the chute structure may determined by selecting the lid size and a non-holding type of coin returning operation may be achieved by adding the inner chute member.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
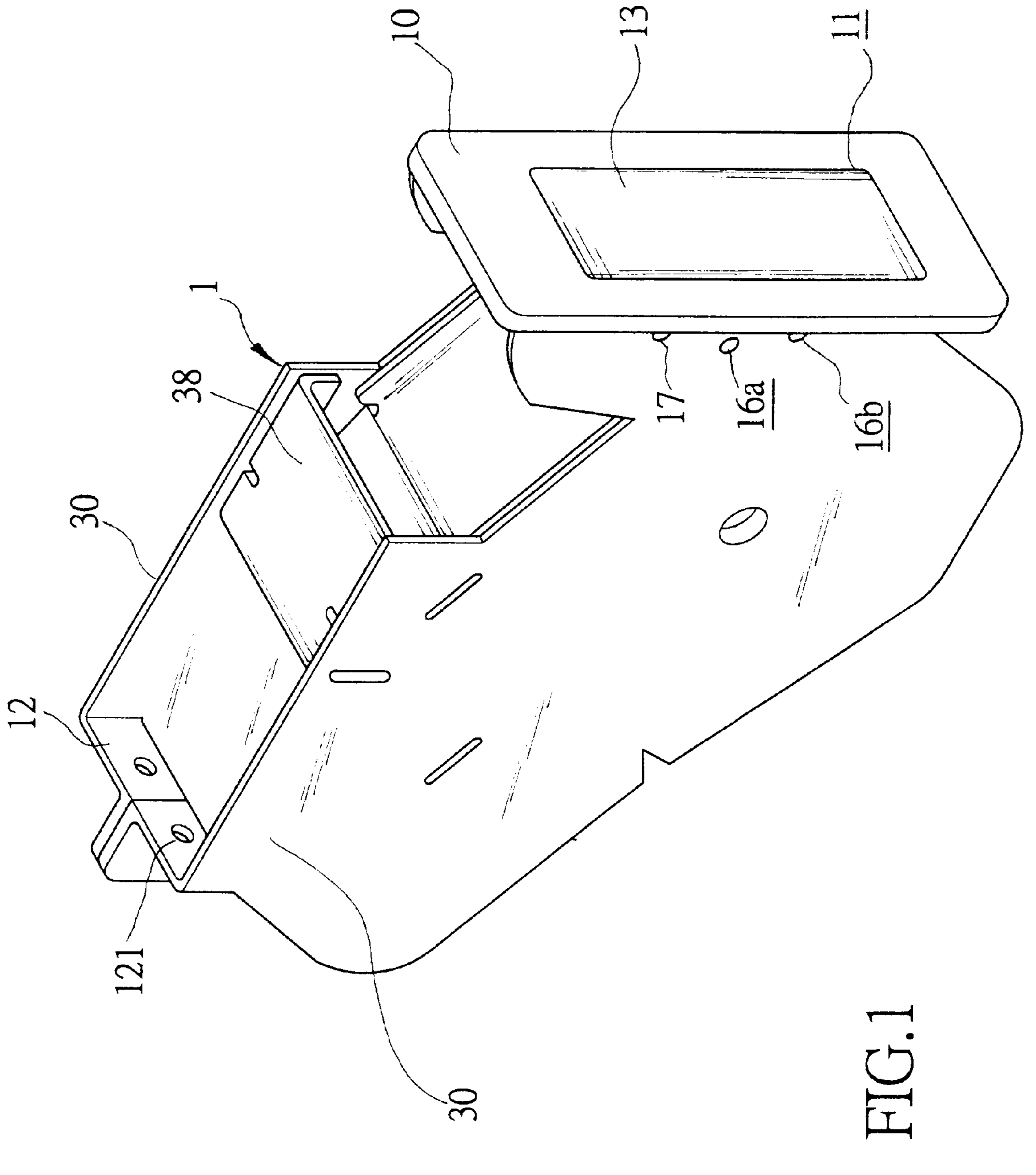
FIG. 1 is a perspective view of a coin return chute structure in accordance with the present invention which is of the holding type.
Figure 2:
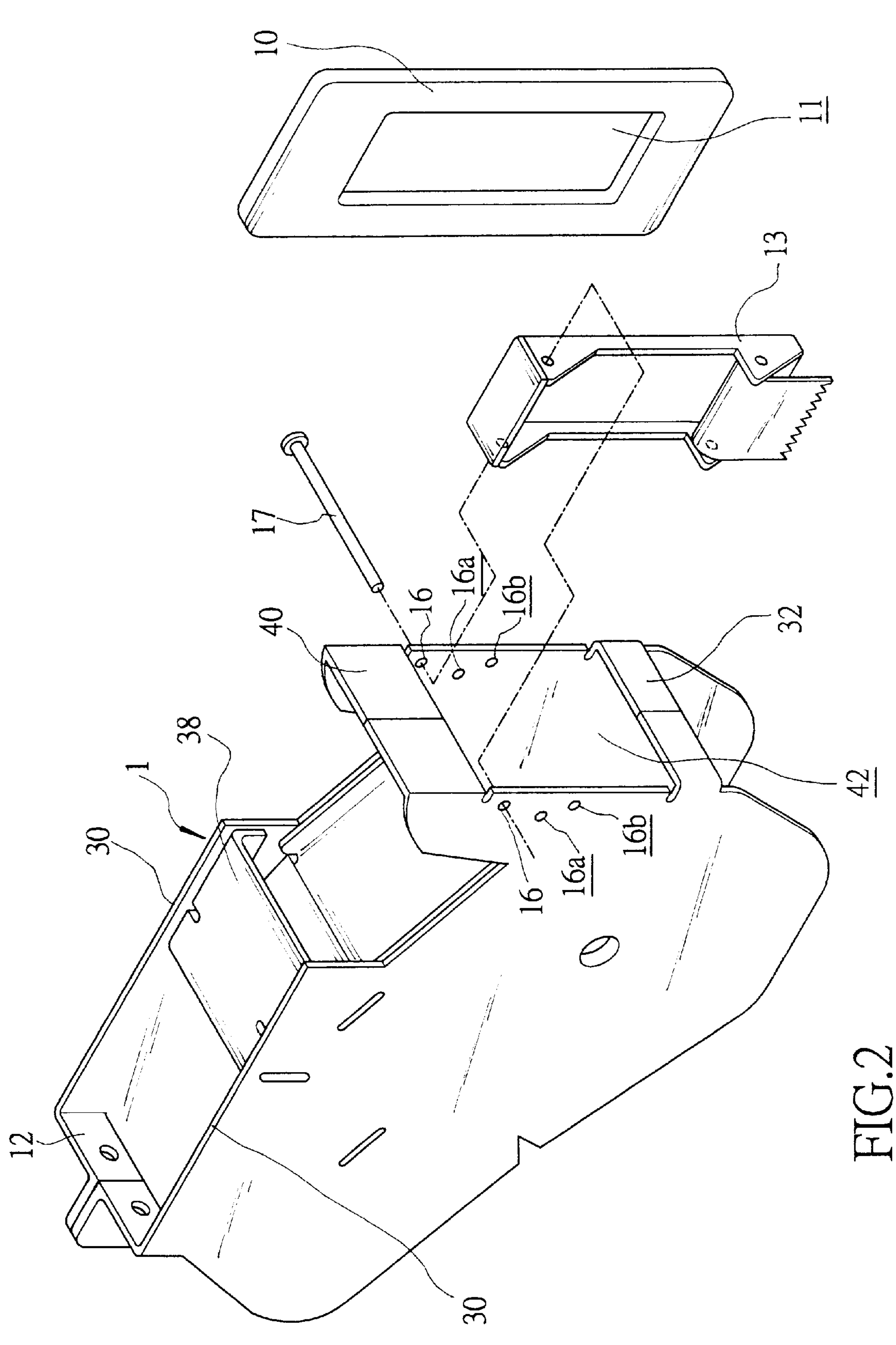
FIG. 2 is an exploded perspective view of the coin return chute structure shown in FIG. 1.

With reference to the drawings and in particular to FIGS. 1 and 2, wherein a coin return chute structure in accordance with the present invention adapted to be incorporated in a payphone (not shown), generally designated with reference numeral 1, is shown, the coin return chute 1 comprises two wall plates 30 spaced from each other a predetermined distance. A bottom plate 34, defining an outer chute member, which is formed with desired curve as shown, is attached to bottom edges of the wall plates 30 to define the coin moving chute for the holding type, wherein the bottom plate 34 is curved in such a way to define a coin holding space 36 (see FIG. 5) for temporarily holding coins (not shown) moving through the bottom plate 34.

If desired, a top spacer 38 may be provided between the wall plates 30 to secure the wall plates 30 together and define the predetermined distance therebetween.

A first cross bar 12 extends between and is connected to the wall plates 30 at a rear side of the wall plates 30 and a second cross bar 32 (see FIG. 2) extends between and is connected to the wall plate 30 at a front side of the wall plates 30. The cross bars 12 and 32 will be further described.

A further cross bar 40 is also provided at the front side of the wall plates 30 and is spaced from the second cross bar 32 to define therebetween an opening 42 which is in communication with the coin holding space 36 and is sized to receive the user's finger therein for picking up the coins (not shown).

A frame member 10, preferably in the form of a rectangle, defining therein a central opening 11, is attached to the front side of the wall plates 30 with the central opening 11 substantially aligned with the front opening 42 of the coin return chute 1 defined by the cross bars 40 and 32 for the payphone users' access to the coin holding space 36.

A lid 13, having a size substantially corresponding to the openings 42 and 11, is pivoted to the wall plates 30 by means of a pivot pin 17 rotatably received in first holes 16 formed on the wall plates 30 in such a way to substantially close the front opening 42 of the coin return chute 1, defining a normally closed condition by means of the weight of the lid 13 itself, and allows an inward rotation about the pivot 17 for user's access to the coin holding space 36.

Such an embodiment that is shown in FIGS. 1 and 2 provides a conventional holding type coin return chute structure.

In accordance with the present invention, besides the first holes 16, the wall plates 30 are each provided with a second hole 16*a* and a third hole 16*b* with the third hole 16*b* being located most close to the second cross bar 32 among the three holes 16, 16*a* and 16*b*.

Figure 3:
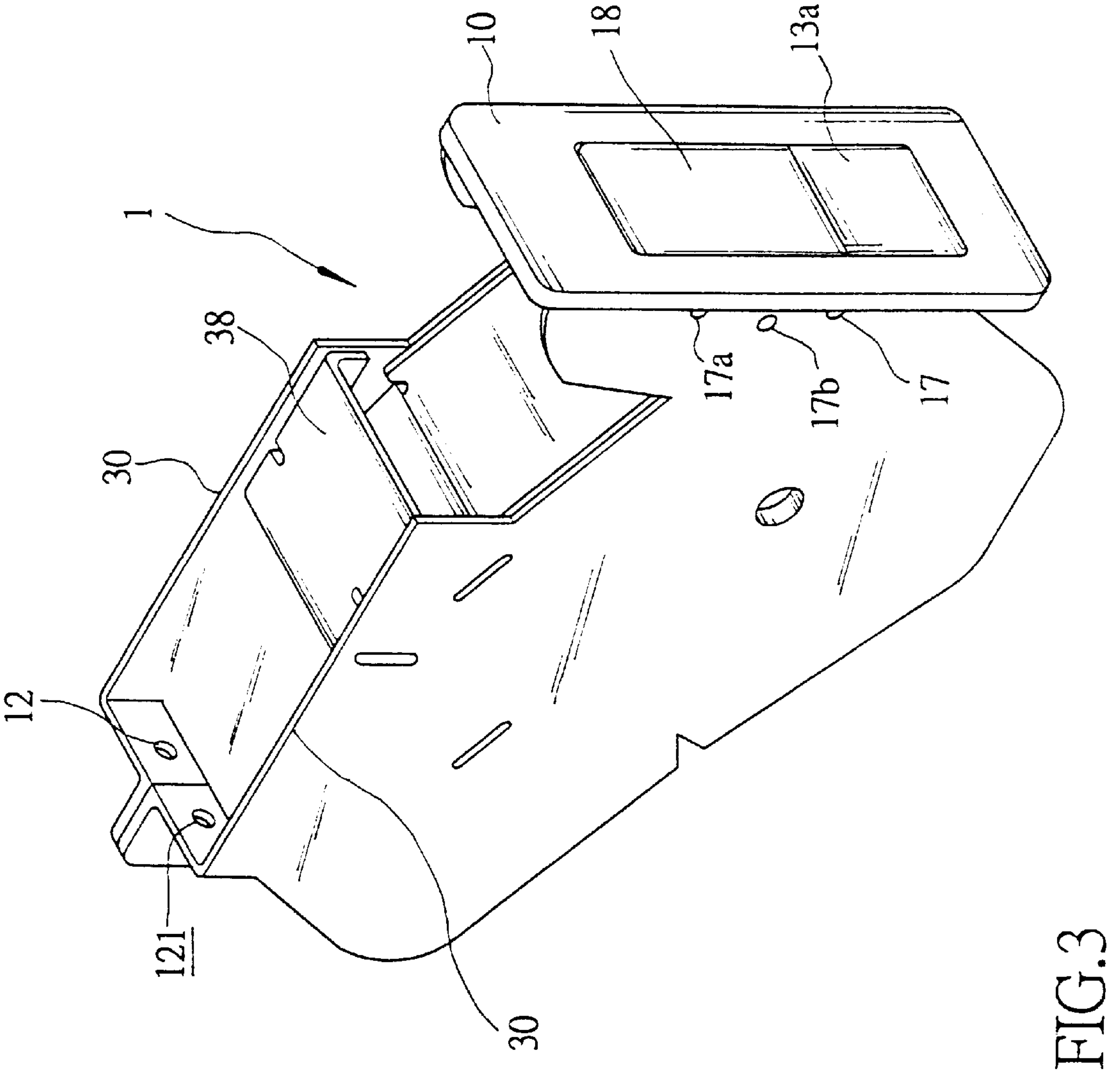
FIG. 3 is a perspective view showing the coin return chute structure in the opening size reduced, holding type.

In a second embodiment of the present invention, as shown in FIG. 3, a lid 13*a* having a size smaller than the lid 13 of the first embodiment shown in FIGS. 1 and 2 is pivoted to the wall plates 30 by means of the pivot pin 17 received in the third holes 16*b*, leaving a portion of the front opening 42 of the coin return chute 1 between the cross bar 40 and top edge of the lid 13*a* uncovered by the small-sized lid 13*a*. An additional cover plate 18 is fixed to the wall plates 30 by means of pins 17*a* received in the first and second holes 16 and 16*a*. This arrangement provides a opening size reduced, holding type coin return chute structure. In this way, the front opening of the coin return chute 1 is actually reduced and thus is better in preventing the burglars from putting explosive material into the coin return chute.

Figure 4:
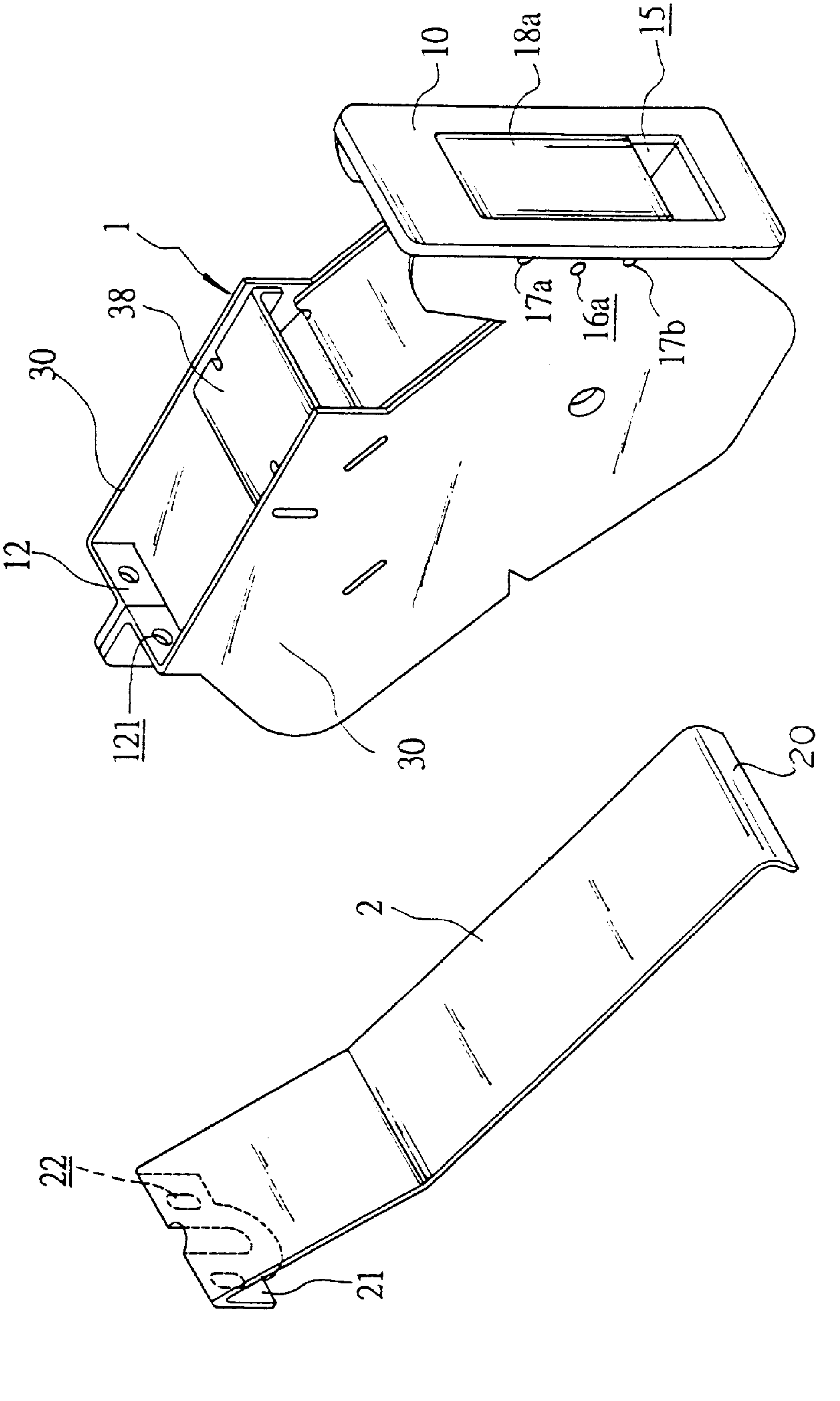
FIG. 4 is an exploded perspective view showing the coin return structure in the non-holding type.
Figure 5:
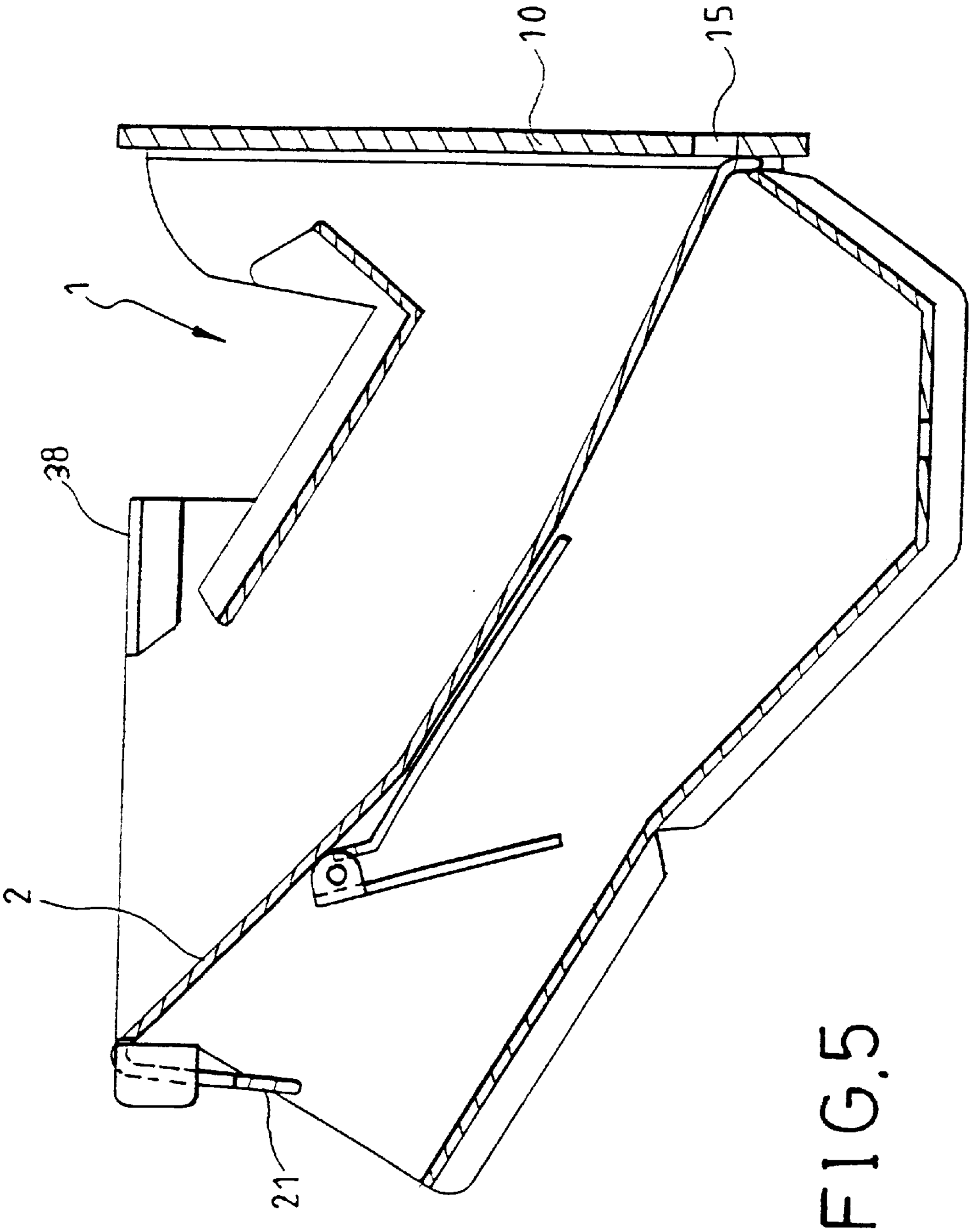
FIG. 5 is a cross-sectional view of the coin return structure in the non-holding type.
Figure 6:
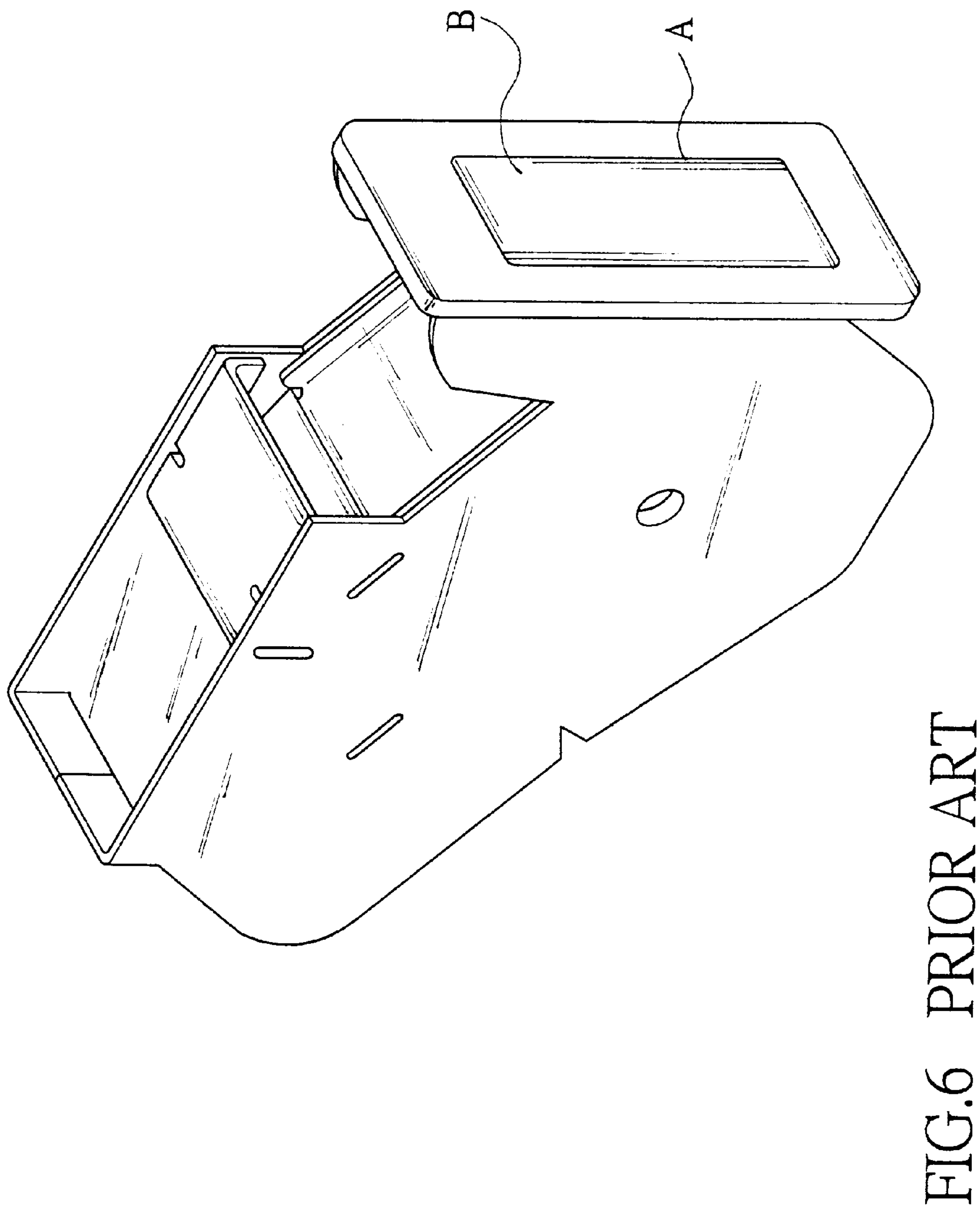
FIG.6 PRIOR ART
FIG. 6 is a perspective view of a prior art coin return structure of a payphone.

In a third embodiment of the present invention shown in FIGS. 4 and 5, a non-holding type coin return chute structure is illustrated. An inner chute member 2 is provided, having two bent ends 21 and 20 to be respectively engageable and supported by the first and second cross bars 12 and 32. The inner chute member 2 bypasses the coin holding space 36 formed on the bottom plate 34 of the coin return chute 1 so that the returned coin(s) will move directly out of the coin return chute 1 without being temporarily held in the coin holding space 36.

A cover plate 18*a*, which may be of a size larger than the cover plate 18 of the second embodiment, is secured to the front opening 42 of the coin return chute 1 by means of pins 17*a* received in the first and third holes 16 and 16*b* of the wall plates 30, leaving only a small opening 15 having a size enough to allow the coins to pass. No rotatable lid is used in this embodiment.

Preferably, the second bent end 21 of the inner chute member 2 is provided with slots 22 and the first cross bar 12 is provided with corresponding holes 121 so that bolts or other fasteners (not shown) may be used to secure the inner chute member 2 to the wall plates 30 by being fixed to the first cross bar 12.

To this point, it is quite obvious that by means of the provision of the three holes 16, 16*a* and 16*b* on the wall plates 30 and the different-sized lids 13 and 13*a*, the cover plates 18 and 18*a* and the inner chute plate 2, the coin return chute in accordance with the present invention is convertible between three different types which may be arbitrarily selected in accordance the practical use of the coin return chute.

Although the preferred embodiments have been described to illustrate the present invention, it is apparent that changes and modifications in the specifically described embodiments can be carried out without departing from the scope of the present invention. Such modifications and changes should be considered within the scope of the present invention which is intended to be limited only by the appended claims.

What is claimed is:

1. A coin return chute structure comprising two wall plates spaced from each other and an outer chute member fixed therebetween to define a coin holding space, a first cross bar and a second cross bar being fixed between the wall plates respectively at rear and front sides of the coin return chute structure, an outer frame member having a central opening of a first size and being attached to the front side of the coin return chute to provide a user's access to the coin holding space, the wall plates being each provided with a first hole, a second hole and a third hole, with the first hole located most distant from the second cross bar and the third hole closest to the second cross bar, the second hole being located between the first and third holes, each selectively receiving therein a pin, a first lid having a size substantially corresponding the first size of the opening of the frame member and a second lid having a size smaller than the first size, the first and second lid being selectively pivoted to the wall plates by means of the pins received in the holes, a first and a second cover members being selectively mounted between the two wall plates by means of the pins received in the holes to partially cover the opening, an inner chute member being selectively mounted to and supported by the first and second cross bars to selectively bypass the coin holding space.

2. The coin return chute structure as claimed in claim 1, wherein the inner chute member has a bent end to engage the first cross bar and wherein the bent end has shots thereon and the first cross bar has corresponding holes thereon adapted to receive fasteners therein and securing the inner chute member to the wall plates.

* * * * *